Feb. 8, 1955  A. SCHUBERT  2,701,623
FILTER
Filed Jan. 12, 1953
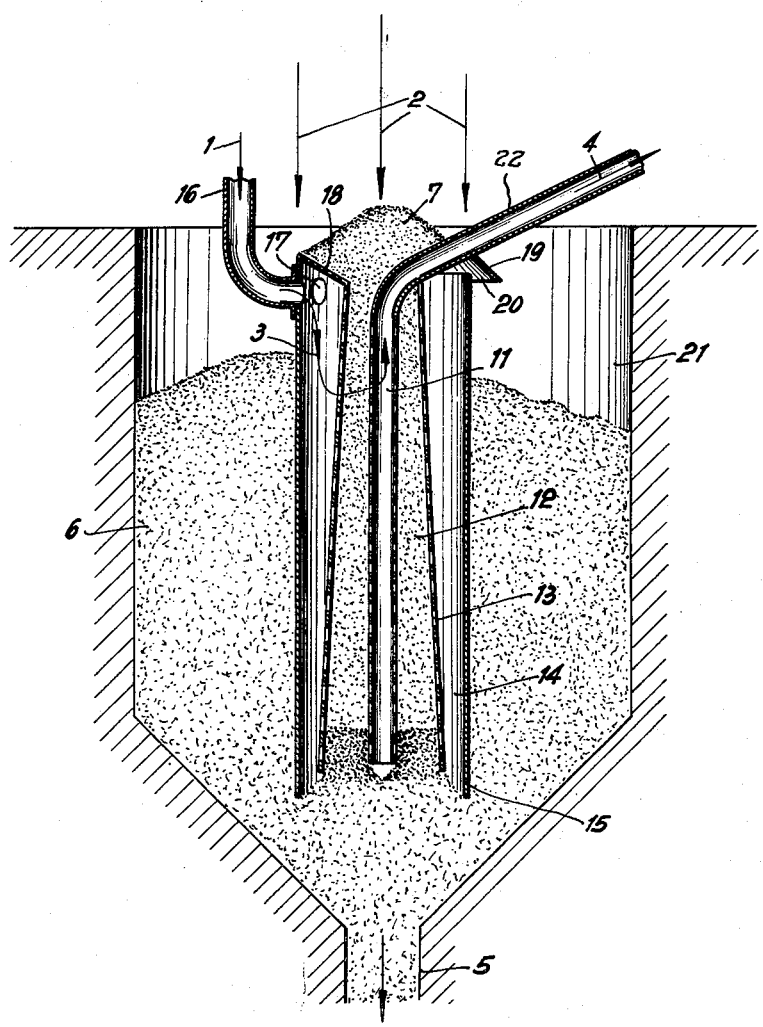
INVENTOR
Arthur Schubert.

United States Patent Office 2,701,623
Patented Feb. 8, 1955

2,701,623

FILTER

Arthur Schubert, Kl. Stockheim, near Braunschweig, Germany, assignor to Miag Muehlenbau und Industrie G. m. b. H., Braunschweig, Germany, a corporation of Germany Application January 12, 1953, Serial No. 330,705

Claims priority, application Germany January 19, 1952

9 Claims. (Cl. 183—46)

This invention is concerned with a filter for use in containers, e. g., storage bins for comminuted materials containing particles of small size and also dust-like particles, e. g., for use in collecting or discharge boots of malt mills or other grain mills.

In mills of the above indicated type, there is the danger of explosion requiring thorough ventilation of the whole mill and of the discharge boot disposed underneath, so as to exhaust the dust laden air which is passed through a separator, replaced in whole or in part by fresh air, and recirculated to the mill. It has been found that conventional centrifugal separators do not provide for a dust removal to such an extent that the danger of explosion is entirely avoided. Cloth filters have therefore been used which, however, have the disadvantage of being combustible and require cumbersome equipment for mechanical cleaning.

The invention avoids the above indicated drawbacks by driving the dust-laden air by suction through a filter layer formed by the material that is being processed. Care is taken for continuously displacing this filter layer in accordance with the displacement of the remaining material, thereby obtaining the advantage of continuous renewal thereof.

An example of the invention will now be described with reference to the accompanying drawing showing in diagrammatic sectional view parts of a collecting or discharge boot which may be disposed underneath a malt mill or similar processing machine.

The material which is being processed is delivered to the collecting and flow-guiding funnel 18, which connects with the filter tube 13. Inside the filter tube is disposed the downwardly open-ended exhaust tube 11. The space 12, between the exhaust tube and the filter tube, is filled with the material being processed. The upper end of the downwardly diverging open-ended filter tube 13 is covered by the funnel 18. The dust-laden air resulting from the processing of the material is drawn in by suction applied to the exhaust tube 11 by suitable means and is delivered to the filter tube 13, which may be made of perforated sheet material or the like, either through openings 17 in the wall of the tubular casing 15 surrounding the filter tube 13 connecting with inlet ducts 16 or through an annular space 20, which is upwardly covered by a shield 19 extending from the wall of the funnel 18. Dust-laden air is in this manner drawn from the space above the material level in the discharge boot (at 20) so long as the boot is only partially filled and also through the conduit 16 in the direction of the arrow 1 from other parts of the mill. The exhaust tube 11 is provided with a suction line 22, which connects with suitable suction apparatus (not shown). All parts of the filter device are disposed within the enclosure formed by the discharge boot 21, to which the processed material is delivered, and which is provided with the discharge passage 5.

The processed comminuted material coming from the mill drops into the discharge boot in the direction of the arrows 2. Care is taken, by suitable means, to direct the bulk of the material to the funnel 18, from which it flows into the annular space 12 between the exhaust and the filter tubes, causing the material to mass in this space and to pile up in the funnel 18, as indicated at 7. Material thereafter delivered flows over the shield 19 into the discharge boot and collects therein for downward discharge therefrom.

In the above described structure, the annular filter space 12 is filled with material being processed shortly after the start of the milling operation, and the filter action speedily begins. Responsive to suction applied to the line 22 in the direction of the arrow 4, dust-laden air is drawn into annular space 14 of the filter from the boot through the annular space 20 and from other parts of the mill in the direction as indicated by the arrows 1 and 3 through conduits such as 16 and the openings 17 in the wall of the tubular casing member 15 (which may also be made of perforated sheet material) and flows radially inwardly through the annular column of material being processed and forming the filter layer 12, and the cleaned air passes through the exhaust tube 11 and is directed to the suction or exhaust apparatus, e. g., a ventilator, along a path indicated by the arrow 4.

Removal of material by way of the discharge passage 5, causes the mass in the boot, and also in the filter space 12, to follow, sliding downwardly, and the filter layer is thereby continuously renewed.

I claim:

1. In apparatus for processing solid materials of the class described and having a receptacle for receiving processed material in the form of comminuted solids containing dustlike particles, a device for filtering dust-laden air resulting in the processing of the corresponding material, said device comprising an outer tubular member extending vertically throughout a substantial part of said receptacle, a first air permeable tubular member disposed within said outer tubular member and forming an annular space therewith, a second air permeable tubular member disposed within said first air permeable member, means for directing processed comminuted solids containing dustlike particles into said first air permeable member for downflow therein around said second air permeable member, said comminuted solids forming an annular column extending between said first and said second air permeable members, inlet means for conducting air containing dustlike particles produced in said processing into said annular space, and means for applying suction to said second air permeable member for drawing said air containing said dust like particles from said annular space and through said column of comminuted processed solids for filtering such air.

2. The structure and cooperation of parts as specified in claim 1, comprising a downwardly widening member constituting said first air permeable member.

3. The structure and cooperation of parts as specified in claim 1, comprising a generally cylindrical member having an air inlet constituting said outer tubular member.

4. The structure and cooperation of parts as specified in claim 1, comprising means for protecting said inlet means to prevent ingress of comminuted processed material into said annular space formed by said first air permeable tubular member with said outer tubular member.

5. The structure and cooperation of parts as specified in claim 1, comprising conduit means extending from said outer tubular member constituting said inlet means for conducting air containing dustlike particles into said annular space formed by said outer tubular member with said first air permeable member.

6. The structure and cooperation of parts as specified in claim 1, comprising a shield disposed above the upper end of said outer tubular member and overhanging such upper end to form said inlet means therewith for conducting air containing dustlike particles into said annular space formed by said outer member with said first air permeable member.

7. The structure and cooperation of parts as specified in claim 1, comprising an angularly outwardly flaring annular portion extending from said first air permeable tubular member at the upper end thereof and joining the upper end of said outer tubular member, holes being formed in said outer tubular member near the upper end thereof forming passages for admitting air containing dustlike particles into the annular space formed by said outer tubular member with said first air permeable member.

8. The structure and cooperation of parts as specified in claim 7, comprising conduit means extending from said outer tubular member for additionally conducting air containing dustlike particles into said annular space.

9. In the art of processing solid material involving comminution thereof and continuous discharge of processed comminuted material including dustlike particles along a predetermined discharge path with consequent evolution of dust-laden air in the vicinity of the comminution apparatus and said discharge path, the process of filtering such dust-laden air to remove dustlike particles therefrom for the purpose of minimizing explosive tendencies of the ambient atmosphere in the vicinity of the comminution apparatus and said discharge path, said process comprising the following steps, namely, defining along said discharge path an area along which portion of said processed comminuted material is compelled to mass for discharge in a continuous compact layer, drawing dust-laden air from the space adjacent such area and/or from the space adjacent the comminution apparatus and driving such dust-laden air through said compact layer, said compact layer of processed material acting as a filter for said dust-laden air and substantially absorbing the dustlike particles therefrom, and expelling the filtered air which is substantially freed of said dustlike particles.

References Cited in the file of this patent

UNITED STATES PATENTS 1,731,223     Brady _____ Oct. 8, 1929

FOREIGN PATENTS 55,928     Switzerland _____ Apr. 5, 1911